United States Patent [19]

James

[11] Patent Number: 5,239,839

[45] Date of Patent: Aug. 31, 1993

[54] THERMAL ENERGY STORAGE APPARATUS ENABLING USE OF AQUEOUS OR CORROSIVE THERMAL STORAGE MEDIA

[76] Inventor: Timothy W. James, Box 20091, Santa Barbara, Calif. 93120

[21] Appl. No.: 716,270

[22] Filed: Jun. 17, 1991

[51] Int. Cl.$^5$ .................. F25D 11/00; F25D 17/02
[52] U.S. Cl. .................. 62/434; 62/430; 165/10; 126/400
[58] Field of Search ........... 165/10, 104.11; 62/430, 62/434, 437, 439, 530; 126/400

[56] References Cited

U.S. PATENT DOCUMENTS

| | | | |
|---|---|---|---|
| 2,525,261 | 10/1950 | Henderson | 62/430 X |
| 3,156,101 | 11/1964 | McGuffey | 62/434 X |
| 3,773,031 | 11/1973 | Laing et al. | 62/430 X |
| 4,193,271 | 3/1980 | Honigsbaum | 62/437 X |
| 4,248,291 | 2/1981 | Jarmul | 62/430 X |
| 4,283,925 | 8/1981 | Wildfever | 62/434 |
| 4,294,078 | 10/1981 | MacCracken | 62/59 |
| 4,393,918 | 7/1983 | Patry | 165/104.11 X |
| 4,751,827 | 6/1988 | Villarreal | 62/430 X |
| 4,753,241 | 6/1988 | Brannigan et al. | 62/530 X |
| 4,807,696 | 2/1989 | Colvin et al. | 126/400 X |
| 4,827,735 | 5/1989 | Foley | 62/430 |
| 4,856,296 | 8/1989 | Shu | 62/430 |
| 4,924,935 | 5/1990 | Van Winckel | 62/430 X |
| 4,951,481 | 8/1990 | Negishi | 62/430 X |
| 5,000,252 | 3/1991 | Faghri | 165/104.11 X |

FOREIGN PATENT DOCUMENTS

| | | | |
|---|---|---|---|
| 0039317 | 11/1981 | European Pat. Off. | 62/530 |
| 2440531 | 7/1980 | France | 62/434 |
| 0051151 | 4/1977 | Japan | 126/400 |
| 0232440 | 11/1985 | Japan | 62/430 |
| 359119 | 10/1931 | United Kingdom | 62/430 |

Primary Examiner—Henry A. Bennet
Assistant Examiner—C. Kilner

[57] ABSTRACT

A thermal energy storage apparatus for use in refrigeration and air conditioning holdover systems is disclosed. The apparatus comprises thermal energy storage media encapsulated in a way that enables use of corrosive and/or aqueous thermal energy storage media in high efficiency refrigeration and air conditioning thermal storage systems; natural convection of a non-freezing, non-corrosive heat exchange fluid provides heat transfer between the encapsulated thermal energy storage media and the refrigeration/air conditioning circuit. Several possible embodiments of the encapsulated media and thermal coupling system that provide efficient heat transfer between the refrigeration circuit and the thermal energy storage media are described. In one preferred embodiment the apparatus comprises a refrigeration circuit, energy storage medium disposed in expandable, preferably cylindrical capsules, and a convective heat transfer fluid which remains liquid over the temperature range of operation, the fluid thermally coupling the refrigeration circuit and the energy storage medium. The preferred embodiments of the invention entail use of a multiplicity of small cylindrical capsules mounted in supporting fixtures (racks, grids, or frames, which are optionally integral to the capsules) or attached to a sheet or grid that supports many capsules. Capsules are by this method closely packed in the space surrounding the refrigeration heat exchanger circuit.

13 Claims, 7 Drawing Sheets

THERMAL ENERGY STORAGE APPARATUS ENABLING USE OF AQUEOUS OR CORROSIVE THERMAL STORAGE MEDIA

BACKGROUND

1. Field of the Invention

The present invention relates to the field of refrigeration and air conditioning. More particularly, the invention relates to thermal energy storage apparatus and methods for use in refrigeration and air conditioning systems that incorporate holdover plates.

2. Background of the Invention

Refrigeration and air conditioning systems frequently utilize structures, often called holdover plates, to store thermal energy for later use. Holdover plates generally comprise a metal vessel having serpentine tubing coiled throughout and a thermal energy storage material disposed within the vessel and surrounding the tubing. The tubing serves as the heat exchanger for the associated refrigeration circuit. The thermal energy storage media used are preferably high heat of fusion eutectic mixtures, that is, a mixture of two or more substances that in combination have a single melting/freezing point with large amounts of heat absorbed/evolved during melting/freezing.

Holdover plate refrigeration systems operate by first freezing the thermal energy storage media by use of a powered refrigeration system. Subsequently, the isothermal heat absorption by the thermal energy storage media upon melting provides extended period holdover refrigeration to maintain the system at the desired temperature. The capacity (i.e., holdover period/heat load product) of the holdover system to maintain the system at a specified temperature is a function, in part, of the heat of fusion of the thermal energy storage medium. Other things being equal, materials having a higher heat of fusion can maintain the specified system temperature for a longer period.

With the exception of two properties, brine solutions are ideal for use as thermal energy storage media; brines are typically low cost, non-toxic, have a high heat of fusion (>50 cal/gram), and have a wide range of eutectic temperatures of interest for refrigeration and air conditioning. The two properties that have limited commercial application of brine solutions in holdover refrigeration systems are (1) they are corrosive and (2) they expand upon freezing. Most metals, and almost all combinations of metals, corrode in brine solutions. This corrosion problem severely limits the material choices for holdover plate construction. For example, copper and aluminum, which are excellent thermal conductors, cannot be used.

Aqueous solutions expand on freezing. This property has limited holdover plate designs to those that can withstand the crushing forces exerted by the solutions during freezing. Because expansion on freezing is inherent to aqueous eutectics, brine solutions are not compatible with efficient fin-and-tube heat exchanger systems in which thin walls on the tubing carrying the refrigerant, and thin fins that extend from the tubing into the surrounding thermal energy storage medium, provide efficient heat transfer between the storage solution and the refrigeration cycle. Such delicate fin and tube structures would be crushed by the expansion of the thermal energy storage solution upon freezing.

Previous holdover plate systems incorporating aqueous eutectics relied on heavy-walled tubing, without fins, run through the storage solution to effect the heat transfer between the thermal storage media and the refrigerant circulated through the tubing. This is an inefficient means of heat transfer between the refrigeration circuit and the thermal energy storage medium of the holdover system. The low surface area and thick walls of the tubing in contact with the thermal storage medium impede heat transfer. Additionally, freezing initiates around the refrigeration cycle tubing, requiring that subsequent heat transfer is not only through the thick tube walls but also through the frozen solution surrounding the refrigeration cycle tubing. Freezing on the tubes degrades efficiency by both impeding conduction (the frozen thermal energy storage medium is a poor heat conductor) and eliminating convective heat transfer from the refrigeration tubes to the unfrozen energy storage medium.

The present inventor currently holds a patent (U.S. Pat. No. 4,719,028) on a class of high heat of fusion thermal energy storage solutions that are non-corrosive and do not expand upon freezing. However, these patented solutions are potentially toxic, and are relatively expensive, unlike low cost and non-toxic brine solutions.

Several prior art patents disclose structures and methods for coating heat storage materials to form pellets. These pellets can be incorporated into plaster board and masonry walls of buildings for heat storage. (See Hatfield, U.S. Pat. No. 4,708,812; Griffen, U.S. Pat. Nos. 4,587,279 and 4,617,332; Salyer, U.S. Pat. Nos. 4,908,116, 4,711,813, and 4,797,160; and Chen, U.S. Pat. No. 4,504,402). Another related patent is Driscoll, U.S. Pat. No. 4,325,230, which describes a means of encapsulating a thermal storage solution for use in place of ice cubes. The encapsulation prevents the problem of melting ice diluting drinks. None of the above-mentioned patents pertain to refrigeration or air conditioning systems, and none relate to the problem of corrosiveness or expansion on freezing of thermal energy storage media.

SUMMARY OF THE INVENTION

The present invention has overcome the disadvantages of the prior art refrigeration and air conditioning holdover systems discussed above. The present invention comprises a means of using thermal energy storage media that are corrosive and/or expand on freezing, with corrodible mixed metal and/or crushable holdover plate apparatus. This is accomplished by encapsulating the thermal energy storage medium so that it does not come into physical contact with the refrigeration circuit directly, but is coupled to it through use of a convective fluid. Further, the encapsulating capsules are positioned and shaped to accommodate the expansion of the aqueous thermal energy storage media upon freezing by deformation of the individual capsules. Preferably, these capsules are further positioned that said deformation will not interfere with the free motion of the coupling fluid or with the structure of the holdover plate itself. Deformable capsules or cells that shrink (i.e., deform, debulge, or dimple) when the thermal energy storage medium is in its liquid state (smallest volume) and that can therefore expand in volume as the encapsulated medium expands upon freezing encapsulate the thermal energy storage medium. Conduction through, and natural convection of, a nonfreezing, noncorrosive heat exchange fluid that fills the interstices between the refrigeration circuit heat exchanger and the encapsulated thermal energy storage medium provides heat conduction from the refrigeration circuit to the encapsulated thermal energy storage medium.

The preferred embodiment of the invention uses a multiplicity of small cylindrical capsules attached to a sheet or grid that supports many capsules, or that are mounted in supporting fixtures. The supporting fixtures may be of several types (e.g., racks, grids, or frames which may or may not be integral to the capsules). Capsules are by this method closely packed in the space surrounding the refrigeration heat exchanger circuit. Any other shape for the capsules consistent with the goals of this invention are possible, yet, for a variety of reasons to be discussed in more detail in the detailed description of the invention, the general preference is cylindrical capsules.

The principal object of this invention is a thermal energy storage device that enables use of corrosive or expanding media integrally dispersed in an efficient heat exchanger, without corroding or damaging (by deformation) the heat exchanger. This is important because the least expensive and highest performance heat storage media for refrigeration and air conditioning temperatures expand upon freezing and are corrosive.

DETAILED DESCRIPTION

An improved thermal energy storage apparatus for refrigeration and air conditioning systems is presented along with a description of several preferred embodiments of said system. In the following numerous details are set forth to provide a thorough understanding of the invention. However, it will be apparent to one skilled in the art that the invention may be practiced without these details. Encapsulating the thermal energy storage medium in a multiplicity of capsules enables efficient refrigeration or air conditioning thermal energy storage in self-contained holdover units. These capsules surround the refrigeration or air conditioning heat exchanger circuit, and are thermally coupled to this circuit via a convective coupling fluid.

The main advantages of the present invention over prior art holdover plate designs are: (1) Encapsulating the thermal energy storage medium so that it does not come into direct contact with the refrigeration circuit enables the use of corrosive thermal energy storage media such as high heat-of-fusion, non-toxic brine solutions in conjunction with efficient refrigeration heat exchanger designs. Efficient heat exchanger designs incorporate thin-walled copper and/or aluminum tubes and fins to provide high thermal conductance. Severe corrosion problems have previously eliminated use of these metals with brine solutions. (2) Expansion of the capsule to its designed shape (e.g., cylindrical) accommodates the expansion/contraction of the encapsulated thermal energy storage medium upon phase change, and positioning said capsules such that at their maximum volume they will not interfere either with the flow of the convective coupling fluid or with the structure of the refrigeration heat exchanger circuit (e.g., by crushing the structure), enables the use of efficient aqueous thermal energy storage media with high-efficiency fin-and-tube heat exchangers or with roll-bonded plate coil type heat exchangers. This invention eliminates the need for toxic and efficiency-reducing softening agents which decrease the heat of fusion of the thermal energy storage media. (3) Encapsulating the thermal energy storage medium in a multiplicity of closely packed capsules that have a cross section small compared to the spacing of the refrigeration circuit tubing, significantly increases the efficiency of thermal energy transfer between the refrigeration circuit and the thermal energy storage medium as compared to that of prior art holdover plate designs in which the thermal energy storage medium is in direct contact with the refrigeration heat exchanger circuit and in which freezing of the thermal energy storage medium initiates around the refrigeration circuit heat exchanger, requiring that subsequent heat transfer between the thermal energy storage medium and the refrigeration circuit must occur by conduction through the frozen media instead of by the more efficient means of convection. In the preferred embodiment of the present invention, a non-freezing convective coupling fluid fills the interstices between the heat exchanger of the refrigeration circuit and the capsules of thermal energy storage medium, therefore convective heat transfer is always active; freezing of the thermal energy storage medium initiates on the inner walls of the numerous capsules. The use of many more capsules than refrigeration circuit tubes reduces the average distance for conduction through frozen medium compared to the situation where freezing initiates directly on the refrigeration circuit tubes. An additional benefit of this approach is that natural convection in the non-freezing coupling fluid (outside the capsules) is in the opposite direction to natural convection in the thermal energy storage medium (inside the capsules). The thermal energy storage medium expands while the coupling fluid contracts in the temperature range near the freezing temperature of the thermal energy storage medium. This opposite expansion/contraction behavior drives natural convection in the two fluids in opposite directions. This counter-flow enhances heat transfer both during freezing of the thermal energy storage medium by the refrigeration circuit and during holdover refrigeration by melting of the thermal energy storage medium. (4) The present invention, by encapsulating the thermal energy storage medium so as to create a corrosion barrier, and to allow room for expansion of said medium, enables the use of high efficiency, environmentally sound, non-toxic, aqueous thermal energy storage solutions with efficient fin-and-tube and roll-bonded heat exchanger systems.

These advantages enable manufacture of cost-effective, efficient thermal energy storage systems for refrigeration and air conditioning by enlarging the number of manufacturing methods, materials of construction, and designs available. We turn now to a description of various preferred embodiments consistent with the goals and objects of this invention.

Figure 1:
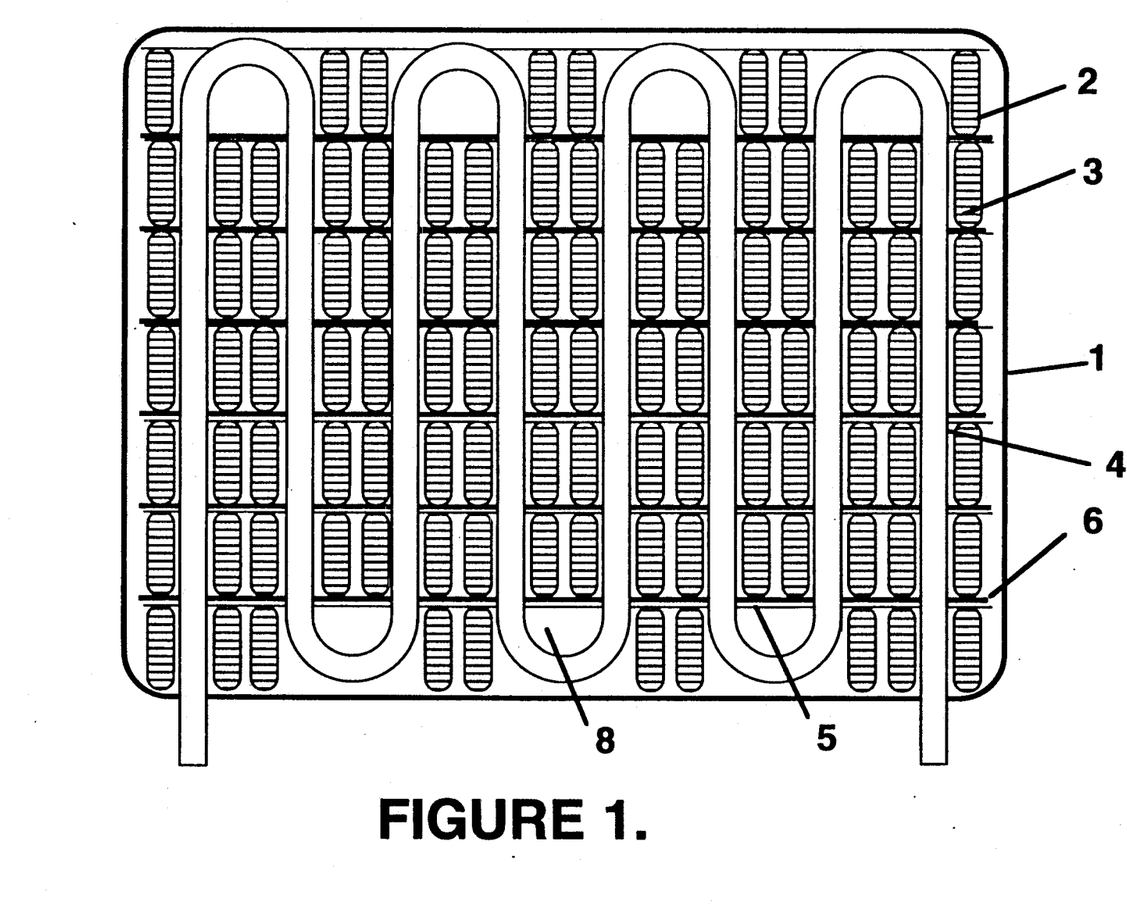
FIG. 1 is a side view of stacks of capsules closely packed in the space surrounding the refrigeration cycle tubing and between the fins of a fin-and-tube type heat exchanger.

FIG. 1 shows schematically a holdover plate 1 containing a multiplicity of capsules 2 encapsulating the thermal energy storage medium 3, and closely packed in the space surrounding the tubes 4 of, and stacked between the fins 6 of, a fin-and-tube heat exchanger. Although a capsule size was chosen for purposes of illustration, in actual practice maximization of thermal energy transfer and ease of manufacture would dictate the size of the capsule. The preferred method for fabrication of the capsules would be by heat forming from sheet or tube stock of a thermoplastic plastic. Plastics are relatively inexpensive, strong, inert to most aqueous solutions, and easy to form.

FIG. 1 illustrates that the thermal energy storage medium 3 is not in direct contact with the refrigeration circuit as it would have been in prior art holdover plate systems. This invention encases the media in capsules 2 thermally coupled to the refrigeration circuit via a convective fluid 8 that does not freeze (remains fluid), and therefore continues to provide convective heat transfer throughout the holdover system thermal cycle. Keeping the thermal energy storage medium 3 from coming into direct contact with the refrigeration circuit enables use of corrosive thermal energy storage media. Although the size and shape of the capsules 2 may vary, their specific design must preferably in practice accommodate the repeated expansion and contraction of the thermal energy storage medium 3 as it changes phase. FIG. 1 also illustrates the positioning of the capsules 2 within the refrigeration circuit structure such that while closely packed in the space surrounding the heat exchanger structure and at their maximum volume they do not interfere with said structure (e.g., tubes 4 and fins 6), nor with the free flow of the convective coupling fluid 8. A cylindrical capsule is the most likely candidate for use in most holdover plates.

Figure 2:
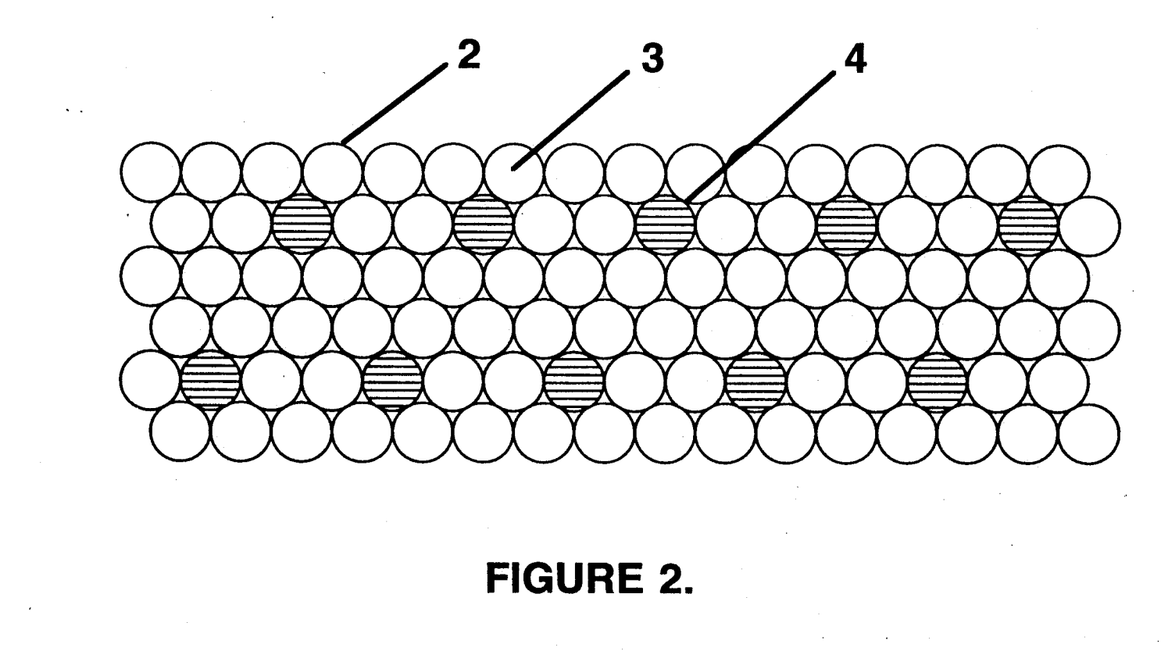
FIG. 2 is an end view showing a possible positioning of the capsules about the refrigeration cycle tubing.
Figure 3:
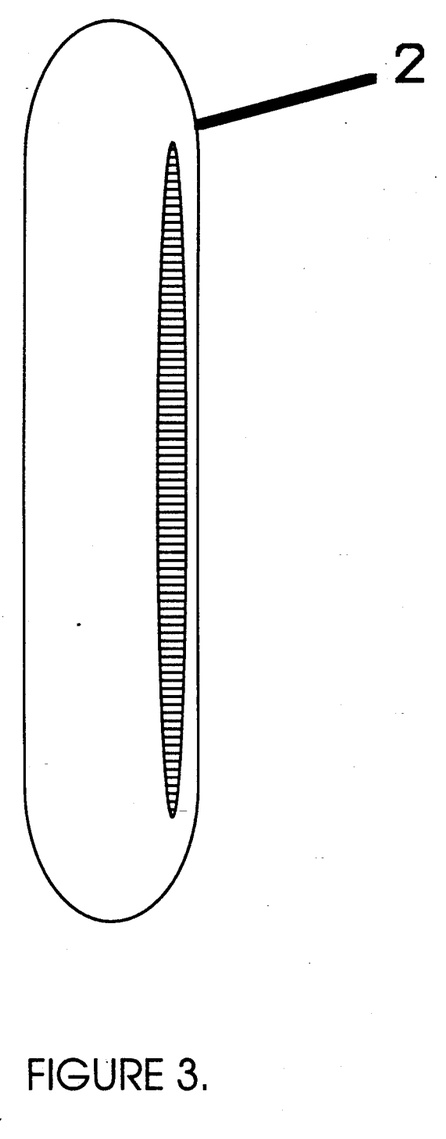
FIG. 3 is an illustration of a perspective side view of an individual thermal energy storage media encapsulating capsule.
Figure 3A:
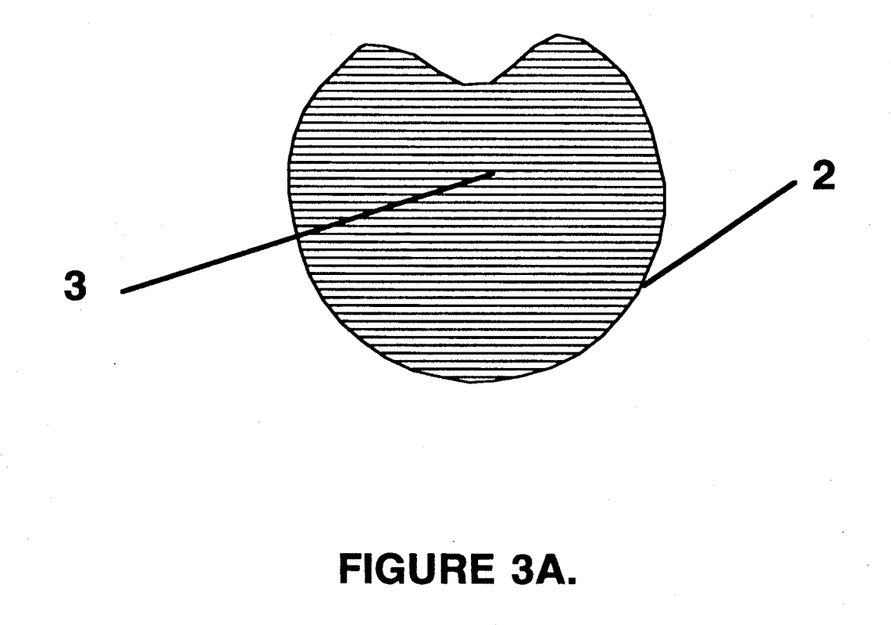
FIG. 3a is an illustration of an view of an individual thermal energy storage media encapsulating capsule illustrating the minimum volume condition, i.e., dimpled.

FIG. 2 shows an end view of a multiplicity of capsules 2 of cylindrical cross section efficiently filling the volume surrounding the heat exchanger tubes 4 of a tube type heat exchanger. FIG. 3 depicts an individual cylindrical capsule and FIG. 3a depicts a cross section showing a possible dimpled state of said capsule 2 when the encapsulated thermal energy storage medium 3 is in its lowest volume state. A multiplicity of small cylindrical capsules is the preferred embodiment of the encapsulation method for a variety of reason: (1) Cylindrical (and spherical) structures retain their shape and therefore have predictable external dimensions when subjected to internal pressure. They resist internal pressure better than other sections because the walls are in tension only. Other sections generate bending stresses in the walls and deform much more readily tending to assume a cylindrical section. (2) Cylinders are more closely packable than spheres. (3) The possibility of freezing initiating in the middle of a capsule forming ice plugs requires capsules of uniform cross section so that the plugs can slide to relieve expansion by additional freezing on one side of the plug. (4) Small cross sections give better coupling between the encapsulated thermal energy storage medium and the refrigeration circuit by reducing the conduction path length through frozen medium. (5) The smaller the capsules the more easily they can be packed to fit in the spaces of a variety of holdover plate structures rather than having to be specifically designed for a particular one.

Figure 4:
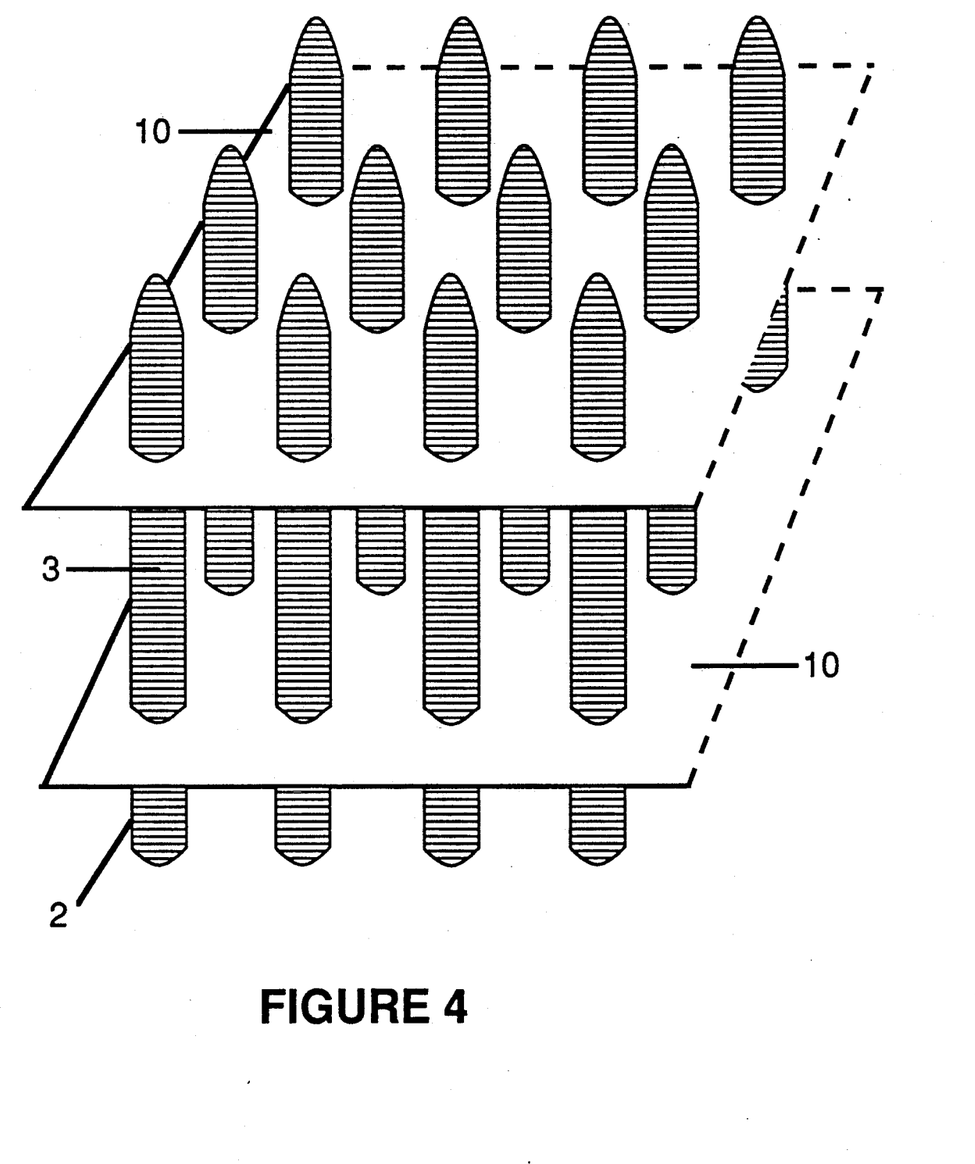
FIG. 4 shows a group of individually sealed capsules mounted in supporting brackets.
Figure 5:
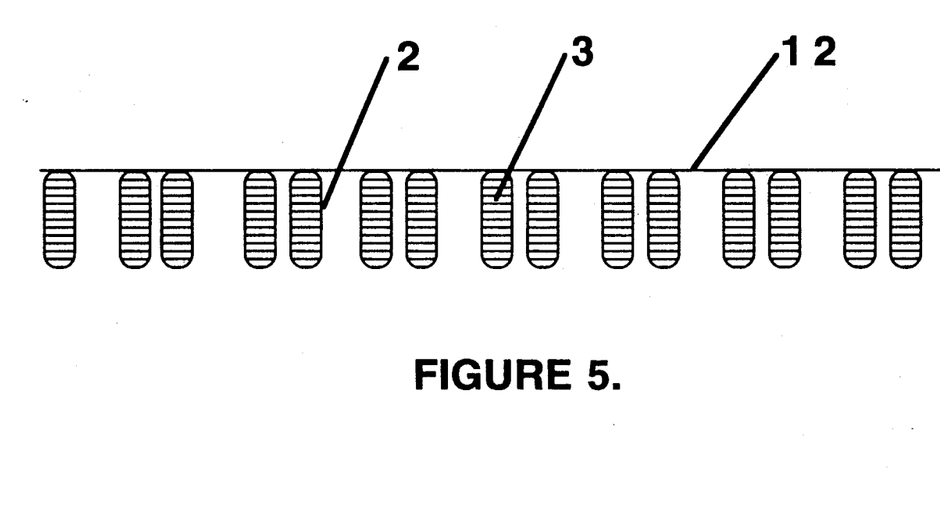
FIG. 5 shows capsules attached at one end to a supporting mesh.

The sealed capsules 2 depicted in FIG. 3 and 3a can be held in position in the holdover plate by either mounting the capsules 2 in a supporting rack 10, as depicted in FIG. 4, or by attaching the capsules 2 to a supporting sheet 12, most likely some kind of mesh, illustrated in FIG. 5. For both methods the supporting structure allows space for the refrigeration circuit apparatus, so as not to interfere with the flow of the convective coupling fluid.

Figure 6:
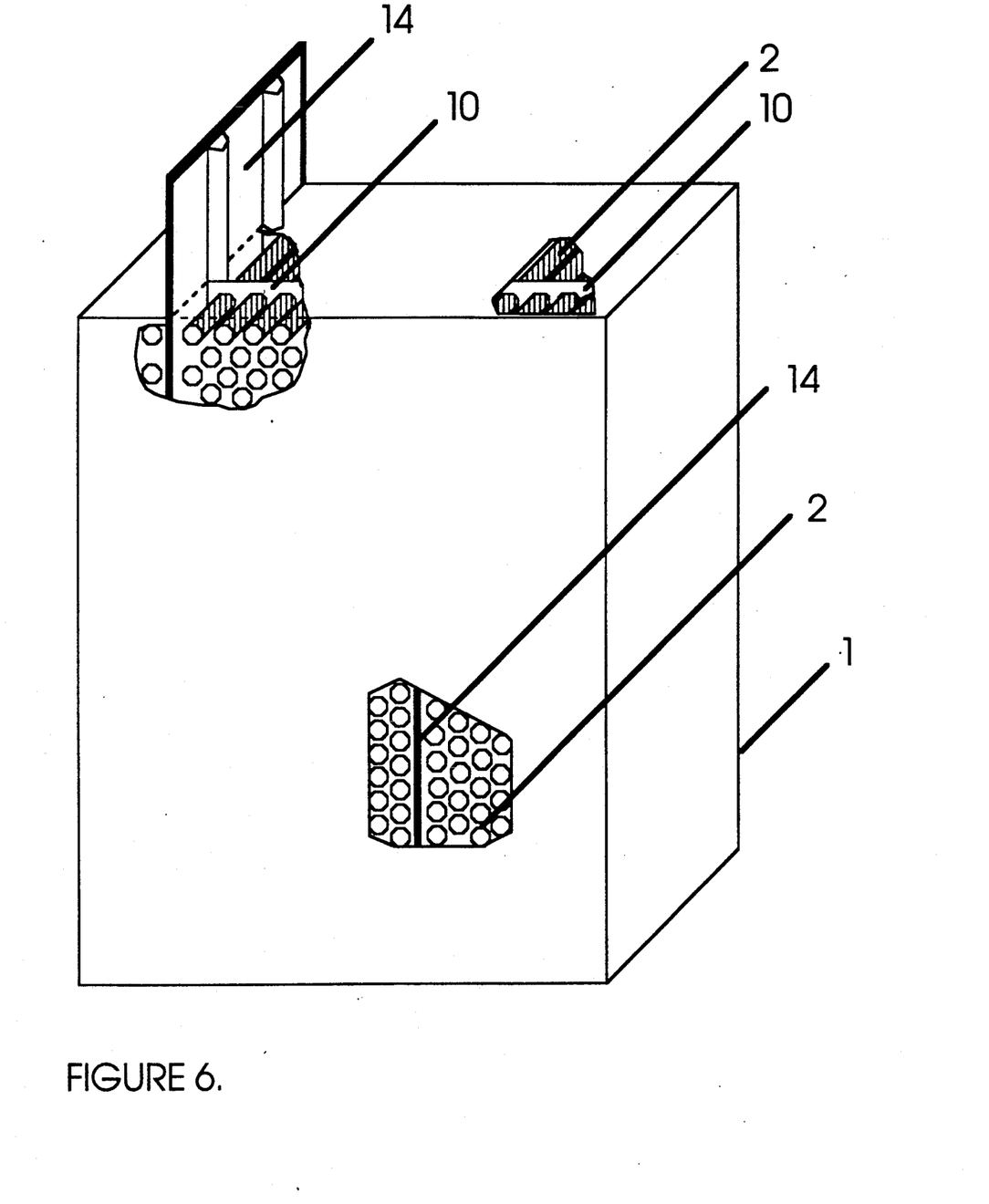
FIG. 6 is a schematic view showing the positioning of capsules around a roll-bonded plate-coil type heat exchanger.

Besides being compatible with fin-and-tube heat exchangers, rack 10 mounted (FIG. 4) or sheet 12 mounted (FIG. 5) capsules are compatible with roll-bonded, plate-coil type heat exchangers in which the thermal energy storage medium capsules fill the volume around a roll-bonded heat exchanger 14 formed into a serpentine shape. As with fin-and-tube heat exchangers, direct contact of the thermal energy storage medium with the roll-bonded heat exchanger plate would severely limit the choices of construction methods, materials, construction designs, and thermal energy storage media useable. According to the present invention the thermal energy storage medium 3 would be encapsulated in capsules 2, closely packed throughout the space in the holdover plate surrounding the roll-bonded sheet heat exchanger 14, and coupled thermally to this heat exchanger via a convective coupling fluid 8, as depicted in FIG. 6.

A further possible embodiment of the invention is one in which encapsulation of the thermal energy storage medium is in the form of a multiplicity of capsules, for example spheres, positioned in the heat exchanger by stacking their external dimensions. In this embodiment the capsules, if small enough relative to the holdover plate, could be poured into the holdover plate filling the necessary spaces. An expansion/contraction dimple is preferably incorporated into each capsule such that it does not alter the stacking of the capsules, i.e., the expansion and contraction would not affect the external dimensions that determine the stacking.

Although specific embodiments of the invention have been described above, clearly various changes and substitutions in materials, details, arrangements shapes, and proportions of the various elements of the present invention can be made without departing from the scope of the invention. For instance, the encapsulating capsules may take any number of shapes or sizes. The method of accommodation of the thermal energy storage medium expansion could be by a variety of methods using either deformable or rigid capsules having and internal compressible gas space. Further, various positioning of the thermal energy storage medium-containing capsules are possible and will be dictated by manufacturing considerations. Other variations and modifications will be apparent to those skilled in the art.

I claim:

1. A holdover plate for thermal energy storage in refrigeration and air conditioning systems, said holdover plate comprising:
   a heat exchanger with an adjacent space in close proximity thereto;
   a plurality of expandable capsules containing a thermal energy storage medium, said capsules substantially filling said adjacent space and said capsules including means to provide for expansion of the thermal energy storage medium without altering outer envelope dimensions of said capsules;

a containment means forming an exterior of said holdover plate and surrounding said heat exchanger and said adjacent space filled with said capsules, said containment means further containing a convective coupling fluid which thermally couples and is non-corrosive to said heat exchanger, said capsules, and said containment means;

and wherein said convective coupling fluid transfers heat primarily through natural convection and conduction and does not freeze at operational temperatures of said heat exchanger.

2. A holdover plate in accordance with claim 1 wherein said means to provide for expansion comprises a dimple element in a surface of said capsules.

3. A holdover plate in accordance with claim 1 including positioning means for securing said capsules in said adjacent space.

4. A holdover plate in accordance with claim 1 wherein said heat exchanger is a fin-and-tube type heat exchanger.

5. A holdover plate in accordance with claim 1 wherein said heat exchanger is roll-bonded.

6. A holdover plate in accordance with claim 1 wherein said heat exchanger is serpentine.

7. A holdover plate in accordance with claim 1 wherein said thermal energy storage medium is aqueous.

8. A holdover plate in accordance with claim 1 wherein said thermal energy storage medium is corrosive.

9. A holdover plate in accordance with claim 1 wherein said thermal energy storage medium is brine.

10. A holdover plate in accordance with claim 1 wherein said convective coupling fluid is chosen from a group comprising aqueous solutions, alcohol solutions, glycol solutions, hydrocarbon solutions, and halocarbons.

11. A holdover plate in accordance with claim 1 wherein said capsules are spherical.

12. A holdover plate in accordance with claim 1 wherein said capsules are substantially cylindrical.

13. A holdover plate in accordance with claim 1 wherein said capsules are formed of plastic.

* * * * *